United States Patent [19]

Dorlars et al.

[11] 3,876,642
[45] Apr. 8, 1975

[54] 4(5'HALO-TRIAZOLYL)-NAPHTHALIMIDES

[75] Inventors: Alfons Dorlars, Leverkusen; Axel Vogel, Cologne Buchheim; Carl-Wolfgang Schellhammer, Schildgen, all of Germany

[73] Assignee: Bayer Aktiengesellschaft, Leverkusen, Germany

[22] Filed: May 31, 1973

[21] Appl. No.: 365,520

[30] Foreign Application Priority Data
May 31, 1972 Germany............................ 2226524

[52] U.S. Cl................... 260/281; 8/177 AB; 8/179; 8/180; 260/37 NP; 260/308 A
[51] Int. Cl............................................. C07d 39/00
[58] Field of Search........................ 260/281, 308 A

[56] References Cited
UNITED STATES PATENTS
3,362,958 1/1968 Schellhamer ...................... 260/281

FOREIGN PATENTS OR APPLICATIONS
1,154,995 6/1969 United Kingdom.................. 260/281
1,556,529 2/1969 France............................ 260/308 A
1,906,662 8/1970 Germany......................... 260/308 A Primary Examiner—Donald G. Daus
Attorney, Agent, or Firm—Plumley & Tyner

[57] ABSTRACT

4-[v-Triazolyl-(2)]-naphthalimides of the formula

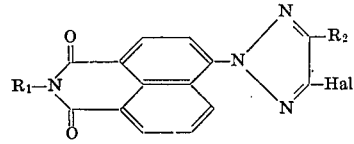

wherein $R_1$ and $R_2$ independently of one another denote an aliphatic radical with 1 to 12 C-atoms, a cycloaliphatic or araliphatic radical or a monocyclic aryl radical while Hal represents halogen, their manufacture and use as brighteners.

2 Claims, No Drawings

4(5'HALO-TRIAZOLYL)-NAPHTHALIMIDES

The subject of the present invention are 4-[V-triazolyl-(2)]-naphthalimides of the formula

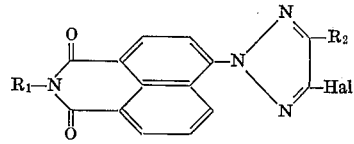

(I)

and their manufacture and use as brighteners.

In the general formula (I)

$R_1$ and $R_2$ independently of one another denote an aliphatic radical with 1 to 12 C atoms, a cycloaliphatic or araliphatic radical or a monocyclic aryl radical, while Hal represents halogen, for example chlorine or bromine.

Preferred compounds of the formula I are those in which $R_1$ and $R_2$ represent a $C_1$–$C_6$-alkyl radical and Hal represents chlorine.

The aliphatic, cycloaliphatic and araliphatic radicals $R_1$ and $R_2$ can be substituted further and among the substituents $C_1$–$C_6$-alkoxy groups, acyloxy radicals, especially $C_1$–$C_6$-alkylcarbonyloxy radicals and monocyclic arylcarbonyloxy radicals or the corresponding sulphonyl radicals, nitrile or carbalkoxy groups, especially carbo-$C_1$–$C_6$-alkoxy radicals are preferred and, for the cycloaliphatic and araliphatic radicals $R_1$ and $R_2$ only, $C_1$–$C_6$-alkyl radicals are preferred.

The monocyclic aryl radicals $R_1$ or $R_2$ can, for example, be further substituted by halogen, such as F, Cl or Br, $C_1$–$C_6$-alkyl or $C_1$–$C_6$-alkoxy groups.

As examples of the radicals $R_1$ and $R_2$ there may be mentioned, inter alia: methyl, ethyl, n- and iso-propyl, n-, iso- and tert.-butyl, amyl, hexyl, octyl, decyl, dodecyl, propenyl, $\beta$-acetoxyethyl, $\beta$-butyroxyethyl, $\beta$-methoxyethyl, $\beta$-benzyloxethyl, cyclohexyl, methylcyclohexyl, benzyl, phenethyl, cyanoethyl, 2-ethylhexyl, phenyl, o-, m- and p-chlorophenyl, o-, m- and p-tolyl and o-, m- and p-anisyl.

The new halogenotriazolylnaphthalimides of the formula (I) can be manufactured in various ways. The most appropriate process consists of halogenating and desoxygenating, in a manner which is in itself known, the N-oxidotriazolylnaphthalimides of the formula

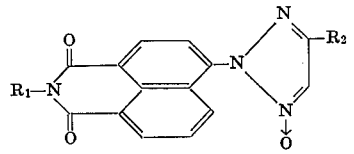

(II)

in which $R_1$ and $R_2$ have the abovementioned meaning, in which case it is expedient to use such halogenating agents as also bring about a desoxygenation in the same batch. As examples of halogenating agents which can be used for this reaction, the following may be mentioned: phosphorous oxychloride or phosphorus trichloride, by itself or in the presence of tertiary bases of carboxylic acid amides, for example trimethylamine, triethylamine, benzyldimethylamine, dimethylformamide, dimethylacetamide and N-methylpyrrolidone; phosphorus pentachloride, or mixtures of chlorine and phosphorus trichloride, phosphorus oxybromide or phosphorus tribromide, thionyl chloride, sulphuryl chloride or mixtures of sulphur dioxide and chlorine, and also pyridine hydrochloride and pyridine hydrobromide.

The reaction takes place at temperatures in the range of about 70°–180°C.

Starting compounds (II) required for the reaction mentioned can be obtained, for example, if 4-hydrazinonaphthalimides of the formula

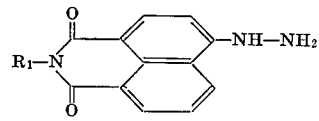

(III)

in which $R_1$ has the indicated meaning, are condensed with 2-keto-aldoximes of the formula

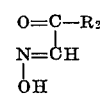

(IV)

in which $R_2$ had the indicated meaning and the resulting $\alpha$-oximinohydrazones of the formula

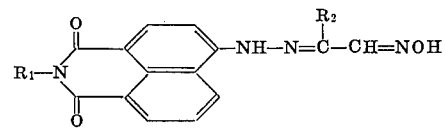

(V)

are cyclodehydrogenated in a known manner.

The reaction of (III) with (IV) is appropriately carried out in organic solvents, especially alcohols or aqueous alcohols, with acid catalysis (formic acid, acetic acid, sulphuric acid, benzenesulphonic acid or toluenesulphonic acid, or phosphoric acid) at about 40° – 100°C.

Examples of suitable $\alpha$-ketoaldoximes (IV) are: oximinoacetone, 1-oximinobutanone-(2), 1-oximinopentanone-(2), 1-oximino-3-methyl-butanone-(2), 1-oximino-3,3-dimethyl-butanone-(2), 1-oximino-3-phenylpropanone(2), 1-oximino-heptanone-(2), oximinoacetophenone, and 4-chloro- and 4-methyl-oximinoacetophenone.

Apart from oximinoacetone and oximinoacetophenone or its nuclear-substituted derivatives, these $\alpha$-ketoaldoximes cannot be manufactured by nitrosylation of the ketones on which they are based; on the other hand, they are obtained easily by condensation of the $\alpha$-ketoaldehydes in question with equimolecular amounts of hydroxylamine or by nitrosylation of the acylacetic acids in question, with simultaneous decarboxylation.

The cyclohydrogenation of the oximinoketones (V) is appropriately carried out warm in solvents which are inert under the particular conditions used such as, for example, pyridine, homologous pyridine bases, dimethylformamide, methylpyrrolidone, dimethylsulphoxide, sulpholane, acetic acid and their mixtures with water or optionally also alcohols.

Suitable dehydrogenating agents are, inter alia: mercury-II oxide, copper-II salts e.g., copper acetate and copper sulphate, complex copper-II salts, lead dioxide, lead tetraacetate, sodium dichromate and potassium dichromate, potassium ferricyanide, hydrogen peroxide, peracetic acid, perphthalic acid and potassium peroxydisulphate.

A technically preferred embodiment consists of the dehydrogenation of (V) in pyridine or technical mixtures of pyridine bases with copper-II salts such as copper sulphate or copper acetate, which can be used in the solid form or in aqueous solution, with the introduction of air being expedient at times.

The naphthalimides of the formula (III) are known or are obtained from 4-amino-naphthalimides of the formula VI

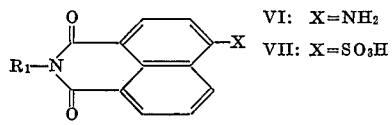

VI: X=NH$_2$
VII: X=SO$_3$H by diazotisation and reduction of the diazonium group, for example with tin-II chloride, or from the 4-sulphonaphthalimides VII by reaction with hydrazine hydrate.

The new compounds of the formula (I) are crystalline, greenish-tinged white powders which as a rule dissolve easily in the customary organic solvents and can also be dispersed well in aqueous systems. As brighteners, they are in particular suitable for the brightening of synthetic materials, such as for the brightening of fibres, filaments, woven fabrics, knitted fabrics, films or plastic compositions of aromatic polyesters (polyethylene glycol terephthalate, polyesters of terephthalic acid and 1,4-bis-hydroxymethylcyclohexane and others), of polymers and copolymers based on acrylonitrile or dicyanoethylene, polyvinyl chloride, polymethacrylates, polyolefines (polyethylene, polypropylene or polystyrene), cellulose 2½-acetate and cellulose triacetate, and for brightening lacquers of cellulose esters.

The brighteners, which contain the compounds of the formula (I) in the pure form or mixed with other suitable additives, are used in a manner which is in itself customary, for example in the form of aqueous dispersions or in the form of organic solvents, such as acetone, glycol methyl ether, glycol methyl ether acetate, methylene chloride, toluene and others.

If desired, the brighteners can also be used in combination with detergents or be added to casting compositions which are used for the manufacture of films or filaments.

The brighteners (I) possess a high level of fastness; they show, for example, excellent fastness to chlorine, chlorite, peroxide and wet processing, and good fastness to light.

EXAMPLE 1

A fabric of texturised polyester fibres is padded with an aqueous liquor which per litre contains 1 g of a commercially available dispersing agent based on fatty alcohol polyglycol ethers, 1 g of a commercially available wetting agent based on alkylnaphthalenesulphonic acids, 4 g of alginate thickener and a solution of 1.02 g (= 3.0 mmols) of N-ethyl-4-[4-methyl-5-chloro-v-triazolyl-(2)]-naphthalimide in 15 g of triethanolamine. The fabric is then squeezed out to a weight increase of 100 percent and is thereafter dried, heated for 1 minute to 170°C and subsequently washed hot. It shows a very clear, strong brightening of good fastness to light and excellent fastness to chlorine and chlorite.

The brightening effect clearly surpasses, in intensity and brilliance, that of the nearest comparable compound, N-ethyl-4-[4,5-dimethyl-v-triazolyl-(2)]-naphthalimide, and also that of N-ethyl-4-[4-methyl-v-triazolyl-(2)]-naphthalimide (British Patent Specification 1,154,995, Example 7, table). The N-ethyl-4-[4-methyl-5-chloro-v-triazolyl-(2)]-naphthalimide employed is manufactured as follows: 26 g of N-ethyl-4-hydrazinonaphthalimide are stirred with 9.6 g of oximinoacetone and 2 ml of 50 percent strength phosphoric acid in 200 ml of alcohol for one hour at 75° - 78°C; thereafter half the alcohol is distilled off. After adding 25 ml of water the crystalline yellow-orange-coloured α-oximinohydrazone (melting point 260° - 261°, decomposition) is filtered off at room temperature and dissolved, whilst still moist, in 200 ml of pyridine. At 70°C, a solution of 54 g of crystalline copper sulphate in 100 ml of water is added dropwise whilst stirring and the whole is stirred for a further half hour at 80°C. The pyridine is then stripped off in steam and the N-ethyl-4-[4-methyl-1-oxido-v-triazolyl-(2)]-naphthalimide which has separated out as crystals is filtered off while still hot and is thoroughly washed with hot water. After a purification by recrystallisation from dimethylformamide, the product is obtained in the form of almost colourless needles of melting point 195°C. Yield 25 g.

25 g of N-ethyl-4-[4-methyl-1-oxido-v-triazolyl-(2)]-naphthalimide are introduced into a solution of 18 g of phosphorus pentachloride in 170 ml of o-dichlorobenzene (manufactured by passing 6 g of chlorine gas into a solution of 12 g of phosphorus trichloride in 170 ml of o-dichlorobenzene). The mixture is stirred for about 20 minutes at 150°–160°, while allowing the resulting phosphorus oxychloride to distil off. After completion of the reaction, the o-dichlorobenzene is driven off by introduction of steam; finally, the reaction product separates out as crystals. After completely removing the solvent, the crude product is filtered off and purified by recrystallisation from methylglycol. 16 g of N-ethyl-4-[4-methyl-5-chloro-v-triazolyl-(2)]-naphthalimide are thus obtained in the form of greenish-tinged white prisms which, when dissolved in dimethylformamide, show a violet-tinged blue fluorescence.

EXAMPLE 2

The 4-[v-triazolyl-(2)]-naphthalimides shown in the table which follows can be manufactured in accordance with the manufacturing instructions given in Example 1 from the relevant 4-hydrozinonaphthalimides N-substituted by R$_1$ (table) and the particular α-ketoaldoximes indicated; the 4-[v-triazolyl-(2)]-naphthalimides give good brightening effects on polyester fabrics and filaments and show the indicated fluorescence colour in dimethylformamide solution.

TABLE

| | R$_1$ | R$_2$ | Hal | α-Keto-aldoxime used | Fluorescence colour in dimethylformamide |
|---|---|---|---|---|---|
| a | CH$_3$ | CH$_3$ | Cl | Oximinoacetone | Violet-tinged blue. |
| b | CH$_3$ | n-C$_5$H$_{11}$ | Cl | 1-oximino-heptanone-(2) | Do. |
| c | C$_2$H$_5$ | CH$_3$ | Cl | Oximinoacetone | Do. |
| d | C$_2$H$_5$ | CH(CH$_3$)$_2$ | Cl | 1-oximino-3-methylbutanone-(2) | Do. |

TABLE—Continued

| | R₁ | R₂ | Hal | α-Keto-aldoxime used | Fluorescence colour in dimethylformamide |
|---|---|---|---|---|---|
| e | $C_2H_5$ | $C(CH_3)_3$ | Cl | 1-oximino-3,3-dimethylbutanone-(2) | Do. |
| f | $C_2H_5$ | n-$C_5H_{11}$ | Cl | 1-oximino-heptanone-(2) | Do. |
| g | $C_2H_5$ | $CH_2$—⟨phenyl⟩ | | 1-oximino-3-phenylpropanone-(2) | Do. |
| h | $C_2H_4OCH_3$ | $CH_3$ | Cl | Oximinoacetone | Do. |
| i | n-$C_3H_7$ | $CH_3$ | Cl | do | Do. |
| k | n-$C_3H_7$ | $CH(CH_3)_2$ | Cl | 1-oximino-3-methylbutanone-(2) | Do. |
| l | i-$C_3H_7$ | $CH_3$ | Cl | Oximinoacetone | Do. |
| m | n-$C_4H_9$ | $CH_3$ | Cl | do | Do. |
| n | n-$C_4H_9$ | $CH_3$ | Br | do | Do. |
| o | n-$C_4H_9$ | $C_2H_5$ | Cl | 1-oximino-butanone-(2) | Do. |
| p | n-$C_4H_9$ | ⟨phenyl⟩ | Cl | Oximinoacetophenone | Blue. |
| q | $CH_2$—$CH(CH_3)_2$ | $CH_3$ | Cl | Oximinoacetone | Violet-tinged blue. |
| r | $CH_2$—CH($C_2H_5$)(n$C_4H_9$) | $CH_3$ | Cl | do | Do. |
| s | n-$C_{12}H_{25}$ | $CH_3$ | Cl | do | Do. |
| t | ⟨cyclohexyl-H⟩ | $CH_3$ | Cl | do | Do. |
| u | ⟨cyclohexyl-H⟩-$CH_3$ | $CH_3$ | Cl | do | Do. |
| v | $CH_2$—⟨phenyl⟩ | $CH_3$ | Cl | do | Do. |
| w | Same as above | $C_2H_5$ | Cl | Oximinobutanone-(2) | Do. |
| x | ⟨phenyl⟩ | $CH_3$ | Cl | Oximinoacetone | Blue. |

EXAMPLE 3

Using a liquor ratio of 1:40, a fabric of polyester fibres is introduced into a bath which per litre contains 1.5 g of sodium oleylsulphonate, 0.75 g of formic acid and 0.1 g of one of the brighteners mentioned in Example 2 under c to 0. The bath is heated to the boil over the course of half an hour and is kept at the boil for about 45 minutes while moderately agitating the fabric. Thereafter the fabric is rinsed and dried. It then has a clear, neutral to pale reddish-tinged brightening of good fastness to light and excellent fastness to washing and to chlorine.

EXAMPLE 4

Using a liquor ratio of 1:40, a fabric of polyester fibres is introduced, in a rolling autoclave, into a bath which per litre contains 1.5 g of sodium oleylsulphonate, 1 g of oxalic acid, 2 g of 80 percent strength sodium chlorite and 0.05 g of one of the brighteners listed in Example 2 under i to w. The rolling autoclave is kept for 45 minutes at 125°C with moderate movement. After cooling, the fabric is rinsed and dried; it then shows a strong and attractive brightening of good fastness to light and excellent fastness to washing.

EXAMPLE 5

Using a liquor ratio of 1:40, a fabric polyacrylonitrile fibres is introduced at room temperature into an aqueous bath which contains, per litre, 1 g of oleylsulphonate, 0.75 g of formic acid and 0.075 g of one of the brighteners listed in Example 2 under c to w. The bath is warmed to 90°–95°C and is kept for 30 minutes at this temperature, while moderately agitating the fabric. Finally, the fabric is rinsed and dried. It then shows a clear brightening which is fast to light and to wet processing.

EXAMPLE 6

Using a liquor ratio of 1:40, a fabric of cellulose triacetate fibres is agitated for 30 minutes in the aqueous bath described in Example 5 at 90°–95°C and is subsequently rinsed and dried. After this treatment, the textile material shows excellent brightening.

EXAMPLE 7

65 g of polyvinyl chloride having a K-value of 72–74, 35 g of dioctyl phthalate, 2 g of a commercially available organic stabiliser containing tin, 1 g of titanium dioxide (rutile) and 0.1 g of one of the compounds mentioned in Example 2 are milled on a hot mill, with slight friction, for 5 minutes at about 165°–170°C; the resulting hide is then drawn off on a four-roll calendar to give a film about 300μ thick. The film shows excellent brightening; the brightening effect has very good fastness to light.

EXAMPLE 8

100 g of polyvinyl chloride suspension polymer having a K-value of 75–78, 2 g of barium-cadmium stearate, 0.5 g of a stabiliser based on dibutyl-tin dilaurate and 1 g of titanium dioxide (rutile) are pressed on a hot mill at about 150°–170°C under a pressure of 40–50 kg/cm² to give a sheet. The sheet thus manufactured has a slightly yellowish-white shade.

If, before milling on the hot mill, 0.1 g of N-ethyl-4-[4-methyl-5-chloro-v-triazolyl-(2)]-naphthalimide is added to the mixture and the procedure indicated above is followed, a substantially brighter, very clear, pure and light-fast white shade is obtained, which shows no tendency to yellow.

EXAMPLE 9

6 kg of dimethyl terephthalate and 5 l of ethylene glycol are mixed with 3 g of zinc acetate and 4 g of one of the brighteners mentioned in Example 2, in a 20 l stirred autoclave. The autoclave is first heated to 180°C while stirring. The trans-esterification begins at about 150°C; methanol which distils off is condensed in a condenser and collected. After an hour the temperature is raised to 200°C and after a further 45 minutes to 220°C. The transesterification is complete after about 2 hours 45 minutes. For the pre-condensation, the mixture is subsequently forced by means of nitrogen into another 20 l autoclave which was heated to 275°C. Excess glycol is distilled off and collected. After 45 minutes, a slight vacuum is first applied; in the course of a further 45 minutes, the pressure is lowered to less than 1 mm Hg, while continuing to stir only slowly. After completion of the polycondensation (about 2½ hours after reaching a pressure of 1 mm Hg) the melt obtained is spun in a known manner to give filaments of gauge 50/25 den. The resulting filaments show an outstandingly clear brightening which is fast to light and to wet processing and stable to chlorite.

EXAMPLE 10

A fabric of polypropylene fibres is padded with an aqueous liquor which per litre contains 1 g of sodium butylnaphthalenesulphonate, 1 g of nonylphenyl polyglycol ether, 4 g of alginate thickener, 20 g of triethanolamine and a solution of 0.8 g of N-ethyl-4-[4-n-pentyl-5-chloro-v-triazolyl-(2)]-naphthalimide (Example 2 f) in 20 ml of dimethylformamide. The fabric is then squeezed out to a weight increase of 70 percent and is thereafter dried and heated to 135°C for 1 minute. Subsequently, the fabric treated in this way is washed hot; compared to untreated material, it shows a clear strong brightening of very good fastness to wet processing, light and chlorite.

Similarly good results are obtained if instead of the compound mentioned in Example 2 under f the brighteners 2 i to w are employed.

EXAMPLE 11

100 g of polypropylene granules and 1 g of titanium dioxide (rutile) are well mixed in end-over-end mixers and converted into thin films at 210°–215°C in a kneading screw with a slit die. A white film is obtained.

If, before the addition of titanium dioxide, 0.1 g of N-n-butyl-4-[4-ethyl-5-chloro-v-triazolyl-(2)]-naphthalimide is added to the polypropylene granules and the indicated procedure is followed, an excellently brightened film of a very attractive pure white of good to very good fastness to light is obtained.

EXAMPLE 12

100 g of polymethacrylate granules are injection moulded into small flat sheets on an injection moulding machine. The small sheets are clear and transparent, with a slight grey tinge.

If 0.01 to 0.02 g of one of the brighteners listed in Example 2 is mixed thoroughly, for example in end-over-end mixers, with the polymethacrylate, injection moulding yields small sheets of a substantially clearer appearance, which no longer possess the grey tinge.

EXAMPLE 13

100 g of polystyrene granules and 1 g of titanium dioxide (rutile) are milled on a hot mill at 155°–160°C to give a hide which is subsequently granulated and injection moulded on an injection moulding machine at 240°–250°C to give small stepped sheets of 0.5 to 3 mm thickness. White, completely opaque mouldings are produced.

If, together with the titanium dioxide, 0.1 g of the brightener listed in Example 2 under q and r is added to the polystyrene granules and the further procedure followed is as indicated above, additionally brightened mouldings of a very pure white having good fastness to light and to weathering are obtained.

We claim:

1. Triazolyl-naphthalimide of the formula

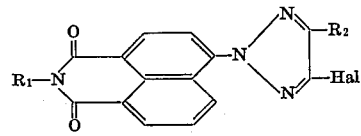

wherein $R_1$ and $R_2$, independently of one another, are selected from the group consisting of unsubstituted alkyl with 1–12 C atoms, methoxy ethyl, cyclohexyl, methylcyclohexyl, benzyl, phenyl, chlorophenyl or methylphenyl; and Hal is chloro or bromo.

2. Triazolyl-naphthalimide of the formula of claim 1, wherein $R_1$ and $R_2$ = $C_1$-$C_6$-alkyl and Hal = chlorine.

* * * * *